(12) United States Patent
Pu

(10) Patent No.: US 8,527,818 B2
(45) Date of Patent: Sep. 3, 2013

(54) INTERFACE WITH UNIVERSAL SERIAL COMMUNICATION

(75) Inventor: Wen-Cheng Pu, Taichung (TW)

(73) Assignee: National Chin-Yi University of Technology, Taichung (TW)

( * ) Notice: Subject to any disclaimer, the term of this patent is extended or adjusted under 35 U.S.C. 154(b) by 167 days.

(21) Appl. No.: 13/239,657

(22) Filed: Sep. 22, 2011

(65) Prior Publication Data

US 2013/0080845 A1 Mar. 28, 2013

(51) Int. Cl.
*G06F 11/00* (2006.01)

(52) U.S. Cl.
USPC .......................................... 714/704; 370/464

(58) Field of Classification Search
USPC .......... 331/25; 375/219; 327/150; 700/464; 714/704; 370/464; 709/204
See application file for complete search history.

(56) References Cited

U.S. PATENT DOCUMENTS

| | | | |
|---|---|---|---|
| 7,315,216 B2* | 1/2008 | Yang et al. ....................... | 331/25 |
| 2005/0261789 A1* | 11/2005 | Chen ................................. | 700/94 |
| 2012/0120967 A1* | 5/2012 | Ghiasi et al. .................... | 370/464 |
| 2012/0294336 A1* | 11/2012 | Burns et al. .................... | 375/219 |
| 2013/0043917 A1* | 2/2013 | de Cesare et al. ............. | 327/150 |

* cited by examiner

*Primary Examiner* — David Ton
(74) *Attorney, Agent, or Firm* — Rosenberg, Klein & Lee

(57) ABSTRACT

An interface with universal serial communication comprises a switching device, a medium device, and a data restoring device for transmitting the data and obtaining the serial communication via one signal line that is inter-strung by afore devices. By simplifying such communication device, the compatibility thereof could be enhanced. Moreover, during the data transmission, computation made by an error coefficient and an error beyond value in the switching device allows the transmitted data to be kept within an acceptable noise value, so that the accuracy of the data could be assured.

3 Claims, 6 Drawing Sheets

INTERFACE WITH UNIVERSAL SERIAL COMMUNICATION

BACKGROUND OF THE INVENTION

1. Field of the Invention

The present invention relates to an interface for transmitting data, especially to an interface with universal serial communication.

2. Description of the Related Art

Information technology makes computers help people with life and work. Herein, the information or data are generally transmitted through an interface adopting the serial communication in a computer. An RS232 interface is commonly applied in industrial communication, modem, and electronic equipment. However, user has to ensure that a consistent transmitting rate on a transmitter and a receiver in time of transmitting the data is set within this interface. That is to say, a Baud Rate has to be properly set for transmitting. If the Baud Rate is set inappropriately, the transmitter and the receiver will have different transmitting rates that may cause an inaccuracy of the data transmission.

There is another interface called i2c (Inter Integrated Circuit) that executes a two-way data transmission through two signal lines. That is, one signal line sends data, and the other signal line receives data. Although this i2c interface avoids setting the Baud Rate like the RS232 interface, the i2c interface is wired so the accordant communication within a long range or beyond a certain distance is thence unavailable.

There is another interface called SPI (Serial Peripheral Interface) that utilizes at least one device serving a host for outputting data. Plural clients are correspondingly set for receiving the data. This interface however has the same problem like that existing in the i2c interface. Namely, a distance between the host and the client is actually short, and the operation of this type of interface requires four signal lines. Obviously, the application of the SPI interface is complicated and unavailable for the communication that is of a long distance. Thereby, the inventor renders a novel interface with universal serial communication for solving shortcomings in the conventional technology.

SUMMARY OF THE INVENTION

It is therefore the purpose of this invention to provide an interface with universal serial communication that transmits data simply via a single signal line, thereby ensuring that the data is transmitted within an allowable noise value so as to make sure correctness of the data.

The interface with universal serial communication comprises a switching device, a medium device, and a data restoring device. Wherein, the switching device includes an encoder, an error coefficient generator, an error beyond value generator, and a calculator connected to the encoder, the error coefficient generator, and the error beyond value generator. The encoder receives data and transforms the data into a binary number. The error coefficient generator generates an error coefficient according to the binary number. The error beyond value generator generates an error beyond value. The binary number, the error coefficient, and the error beyond value are input into the calculator for being further integrated to a calculating result and hence output. The medium device receives the calculating result from the calculator and transforms the calculating result into a correspondent pulse wave for outputting. An amount of the pulse wave equals the calculating result integrated and output by the calculator. The data restoring device includes a frequency divider for receiving the pulse wave from the medium device, a counter connected to the frequency divider, and a decoder connected to the counter. The frequency divider isolates a low frequency pulse wave from a high frequency pulse, so that the low frequency pulse wave is served as a synchronic signal, and the high frequency pulse wave is analyzed by the counter for counting the amount of the pulse wave. While the binary number is achieved in the counter via the amount of the pulse wave dividing the error coefficient, the binary number would be restored to original data.

Preferably, the correspondent amount of the pulse wave is reckoned by the binary number times the error coefficient plus the error beyond value.

Preferably, an outputting number is reckoned by the binary number times the error coefficient plus the error beyond value; the binary number is Numb, and the outputting value is N, thereby resulting in a formula as N=Numb×the error coefficient+the error beyond value; while a bandwidth is $\xi$, $f_s$ then represents a speed that a transmitter transmits the encoded data to a receiver; calculated as $\xi=f_s/N$ (Bps).

Preferably, the switching device adopts a sensor that detects and transmits signals of instant environmental conditions in accordance with a movement of users.

Preferably, the medium device and the data restoring device are integrated as a server; while a plurality of servers are adopted, signal packets transmitted by every sensor are able to be received.

Preferably, at least one cloud server and a plurality of devices connected to the cloud server are installed on the interface; while at least one cloud server is connected to each device, the cloud server further communicates with the other cloud server through broadcast; the cloud server is also able to communicate with each other through an intercommunicated broadcast.

Preferably, the server adopts an LED displayer including a displaying unit installed in the LED displayer so as to allow the server to present a result from transforming transmission signals into the correspondent packets.

Accordingly, the present invention requires merely one signal line that renders intercommunication within the switching device, the medium device, and the data restoring device so as to transmit the data and obtain the serial communication. Obviously, the communication device could be simplified and concurrently, the device could be more extensively applied. During the data transmission, the error coefficient and the error beyond value allow the transmitted data to be maintained within an acceptable noise value, thereby ensuring the correctness of the data.

BRIEF DESCRIPTION OF THE DRAWINGS

FIG. 5-1 is a schematic view showing a first packet being transmitted;

FIG. 5-2 is a schematic view showing a second packet being transmitted;

FIG. 5-3 is a schematic view showing a third packet being transmitted;

FIG. 5-4 is a schematic view showing a fourth packet being transmitted; and

FIG. 5-5 is a schematic view showing a fifth packet being transmitted.

DETAILED DESCRIPTION OF THE PREFERRED EMBODIMENTS

Figure 1:
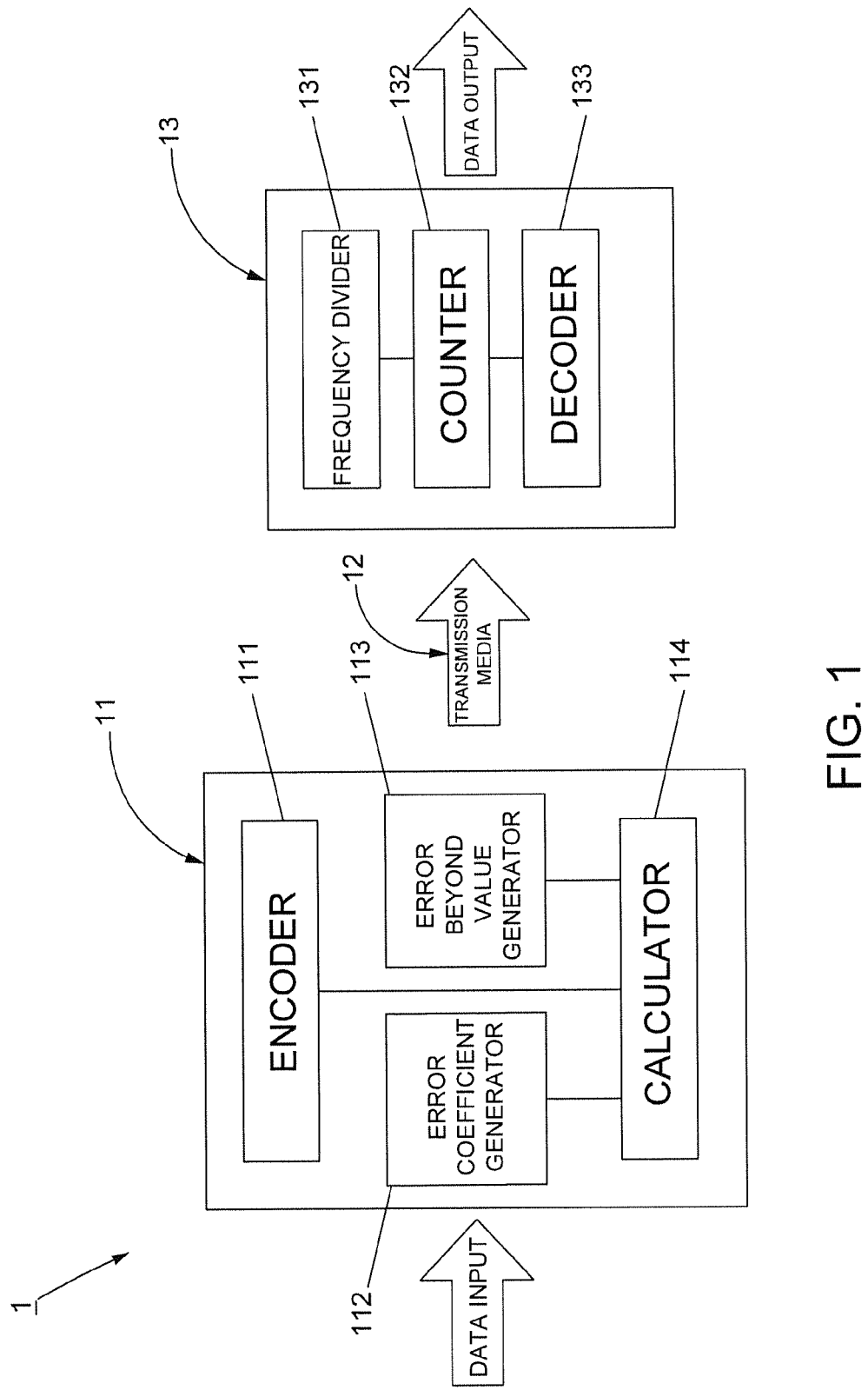
FIG. 1 is a schematic view showing the present invention.

Wherever possible, the same reference numbers are used in the drawings and the description to refer to the same or like parts.

Referring to FIG. 1, a first preferred embodiment of the present invention is shown. An interface 1 with universal serial communication comprises a switching device 11, a medium device 12 receiving data from the switching device 11, and a data restoring device 13 receiving data transmitted from the medium device 12. Wherein, a single signal line is provided with intercommunication within the switching device 11, the medium device 12, and the data restoring device 13, so that the data could be transmitted and the serial communication is obtainable. Herein, the switching device 11 includes an encoder 111, an error coefficient generator 112, an error beyond value generator 113, and a calculator 114 that is connected to the encoder 111, the error coefficient generator 112, and the error beyond value generator 113. The encoder 111 receives the data so as to transform the data into a binary number. Concurrently, the error coefficient generator 112 generates an error coefficient according to the binary number and concurrently the error beyond value generator 113 generates an error beyond value. Thus, the binary number, the error coefficient, and the error beyond value are input into the calculator 114 for being further integrated into a calculating result and hence output.

Continuingly, the medium device 12 receives the calculating result from the calculator 114 and transforms the calculating result into a correspondent pulse wave for outputting. Especially, an amount of the pulse wave equals the calculating result integrated and output by the calculator 114. Herein, the medium device 12, or the signal line that is provided for transmitting data and obtaining the serial communication, could adopt wireless or wired transmission. The wireless transmission could be Wi-Fi, Wi-Max, GSM/GPRS, RF, or infrared rays; the wired transmission could be coaxial cable, twisted-pair cable, power line, or optical fibers. As to the data restoring device 13, a frequency divider 131 for receiving the pulse wave output from the medium device 12, a counter 132 connected to the frequency divider 131, and a decoder 133 connected to the counter 132 are included.

Figure 2:
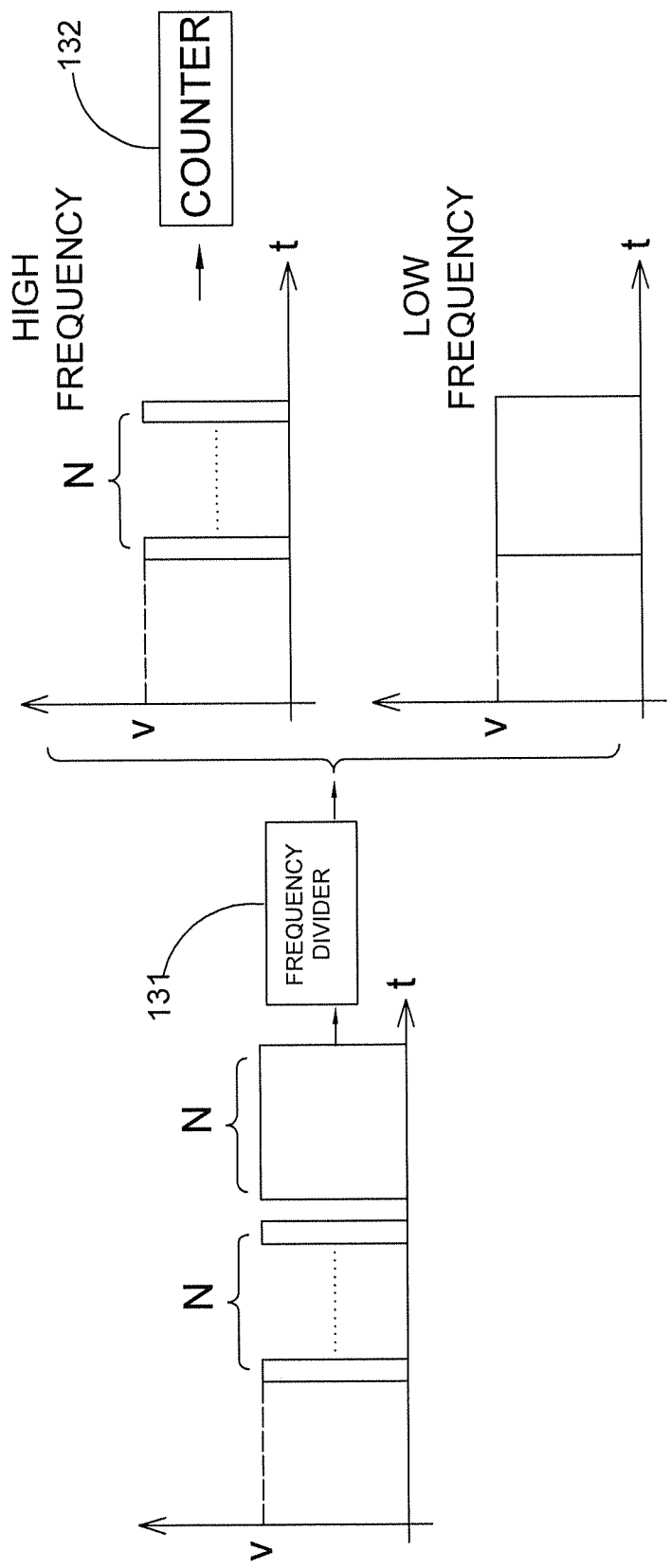
FIG. 2 is a schematic view showing a divider of the present invention in operation.

Accompanying with FIG. 2, the frequency divider 131 isolates low frequency pulse waves from high frequency pulse waves in the pulse waves. Thereby, the low frequency pulse waves are served as synchronic signals, and the counter 132 analyzes the high frequency pulse wave for counting an amount of the pulse wave. While the binary number from the switching device 11 is achieved in the counter 132 via the amount of the pulse waves dividing the error coefficient, the decoder 133 thence restores the binary number to the original data.

In operation, the data is transmitted into the switching device 11 for the encoder 111 to receive. Thereby, the encoder 111 encodes the data into binary numbers that are suited to the PC or other like devices. Wherein, the binary numbers generated by the encoder 111×error coefficient+error beyond value=an output number. Every digit in the binary numbers is called a bit. At most of each bit generates the binary number as a Numb, and the output number is an N, thereby bringing about the following formula:

$N = \text{Numb} \times \text{error coefficient} + \text{error beyond value}$

For example, when the transmitted data $(1100)_2$, the transmitting formula of each bit is as follows:

$0 \times \text{error coefficient} + \text{error beyond value} = \text{encoded output number } N$ When a transmitting bandwidth is $\xi$, $f_s$ shows a speed adopted to the pulse wave that is encoded after the calculator 114 of the switching device 11 transmitting the data. Thereby, a further formula is achieved as follows:

$\xi = f_s / N$ (Bps)

Accordingly, a lowest bandwidth is maintained during the data transmission. Cooperating with the data that is transformed into the binary numbers, the coefficient generator 112 preferably generates an error coefficient in accordance with an instant environmental condition in time of transmission. A relative relationship between the transmission environment and the error coefficient is shown in Form 1 as follows. Additionally, the error beyond value generator 113 generates an error beyond value, and a relative relationship between the error beyond value and the error coefficient is shown in Form 2 as follows.

| ▲FORM 1 | |
|---|---|
| TRANSMISSION ENVIRONMENT | RELATIVE ERROR COEFFICIENT |
| INFERIOR | 16 UP |
| BAD | 16 |
| ORDINARY | 8 |
| GOOD | 4 |
| SUPERIOR | 2 |

| ▲FORM 2 | |
|---|---|
| ERROR COEFFICIENT | ERROR BEYOND VALUE |
| 16 UP | CHOSEN VALUE/2 |
| 16 | 8 |
| 8 | 4 |
| 4 | 2 |
| 2 | 1 |

Figure 3:
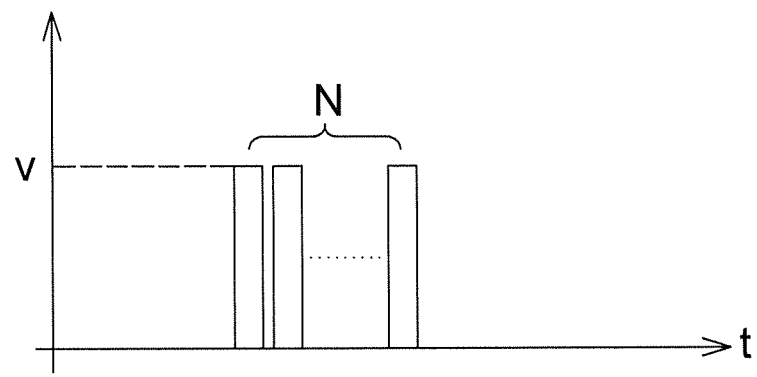
FIG. 3 is a schematic view showing pulse waves being transmitted.
Figure 4:
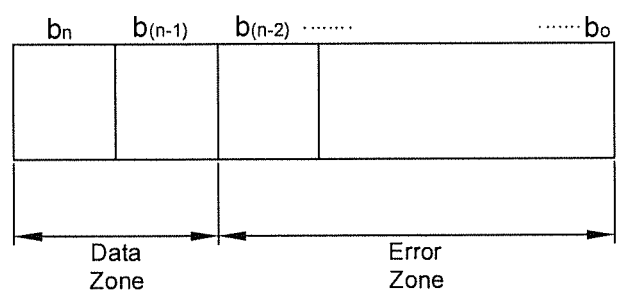
FIG. 4 is a schematic view showing packets being adopted for transmission.

Accordingly, when the binary numbers generated by the encoder 111 multiply the error coefficient then plus the error beyond value, a calculating result is able to be integrated and output. Referring to FIG. 3, the data that is transformed into the binary number could be further converted to packets for transmission. FIG. 4 shows a definition of a Data Zone of the transmitted data. Form 3 presents detecting codes in an Error Zone for detecting errors.

| ▲FORM 3 | | |
|---|---|---|
| bn | b(n − 1) | NOTE |
| 0 | 0 | NOT DEFINE |
| 0 | 1 | "0" IS TRANSMITTED |
| 1 | 0 | "1" IS TRANSMITTED |
| 1 | 1 | TRANSMISSION ENDS |

When the medium device 12 receives the calculating result output from the calculator 114, the calculating result would be transformed in accordance with the amount of the pulse wave so as to be output. Therefore, the amount of the pulse wave is equal to the calculating result integrated and hence output by the calculator 114. For example, the data to be transmitted (4) $10 <=> (0100)_2$. Wherein, "0100" is shifted leftward for 3 bits in accordance with the practical environment. As it should be, the leftward shifting quantity of the bit is decided by a test result in time of the practical operation. Namely, the data $(4)_{10}$ times $(8)_{10}$ equals $(32)_{10}$. Afore decimal numbers could be also expressed by $(0100000)_2$ in a binary form. Herein, the binary form is conventionally adopted, and the decimal form is adopted in the present invention. Thereby, $(32)_{10}$ or $(0100000)_2$ decides the number of the pulse waves. Whereby, a formula for the pulse waves could be achieved as follows: $N=(4)_{10} \times (8)_{10}+(8/2)$. Favorably, the medium device 12 sends the equal pulse wave. Further, the speed $f_s$ of the pulse wave is not limited. A higher speed results in a wider bandwidth ω; a lower speed results in a narrower bandwidth. A formula for calculating the bandwidth ω is shown as follows: $\omega=f_s 8(bit/time)/Nx$. A formula for calculating the relative amount of the pulse wave in the medium device 12 is shown as follows:

the amount of the pulse wave=$N$(the binary number× the error coefficient+the error beyond value)

Thereby, after the frequency divider 131, the counter 132, and the decoder 133 receiving the pulse waves output by the medium device 12, the binary number is thence restored by the calculator 114 so as to achieve the original data. Namely, the data is previously altered into the binary numbers (ex. $(1011)_2$). The practical operation is as follows:

In a first transmission, "1" is transmitted.

Achieve a result calculated via the formula $N=(10)_2 \times$ error coefficient+error beyond value and send the same result, thereby allowing the result to be decoded by the data restoring device 13. Accordingly, the data including one bit are transmitted.

In a second transmission, "1" is transmitted.

Achieve a result calculated via the formula $N=(10)_2 \times$ error coefficient+error beyond value and send the same result, thereby allowing the result to be decoded by the data restoring device 13. Accordingly, the data including one bit are transmitted.

In a third transmission, "0" is transmitted.

Achieve a result calculated via the formula $N=(01)_2 \times$ error coefficient+error beyond value and send the same result, thereby allowing the result to be decoded by the data restoring device 13. Accordingly, the data including one bit are transmitted.

In a fourth transmission, "1" is transmitted.

Achieve a result calculated via the formula $N=(10)_2 \times$ error coefficient+error beyond value and send the same result, thereby allowing the result to be decoded by the data restoring device 13. Accordingly, the data including one bit are transmitted.

In a fifth transmission, " " is transmitted, namely, the transmission is complete.

Achieve a result calculated via the formula $N=(11)_2 \times$ error coefficient+error beyond value and send the same result, thereby allowing the result to be decoded by the data restoring device 13. Accordingly, all of the data are transmitted. The binary data of n bits are all suited to afore process. As it should be, a reverse operation is also available.

Figures 1, 5:
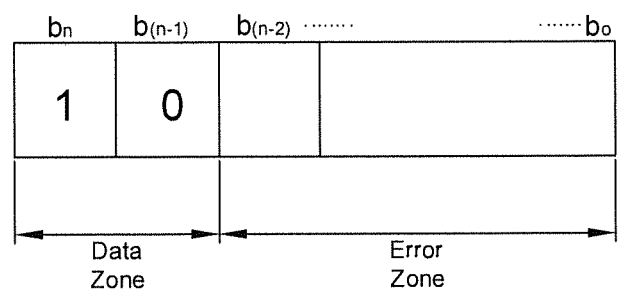
Figures 2, 5:
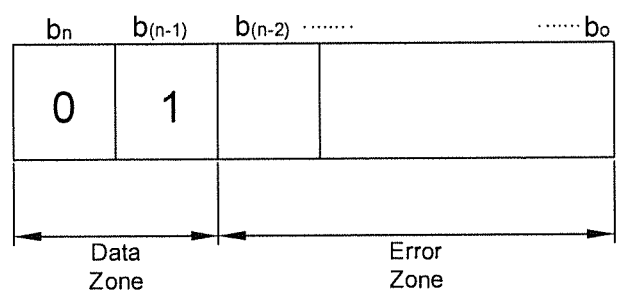
Figures 3, 5:
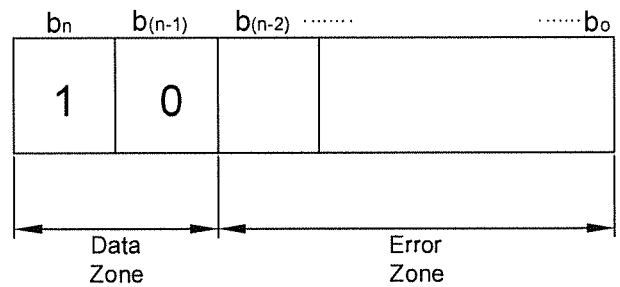
Figures 4, 5:
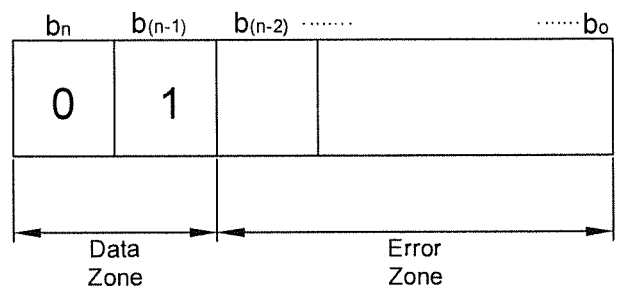
Figure 5:
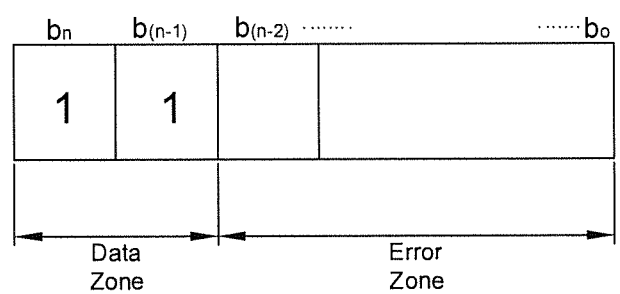

Consequently, when the binary data restored by the data restoring device 13 is $(01)_2$, one bit is now transmitted and the accordant value is "0". When the binary data restored by the data restoring device 13 is $(10)_2$, one bit is now transmitted and the accordant value is "1". When the binary data restored by the data restoring device 13 is $(11)_2$, one bit is now transmitted, which represents that a controlling code is achieved, thereby ending the packets. When the binary data restored by the data restoring device 13 is $(00)_2$, it means that anonymous noise is incurred and the noise should be ignored. Accordingly, each packet represents that one single bit is transmitted, so 1 Bytes (or 8 bits) represent that 8 packets are sent, and n bit represents that n packet are sent. At a final stage, a packet of $(11)_2$ is transmitted. After the final, the data of one bit is transmitted. Both "1" and "0" represent a new start of the data transmission. For example, when the "data"=$(1010)_2$ is transmitted, the packets to be output are arranged as a sequence as follows. FIG. 5-1 shows the transmitted data is "1"; FIG. 5-2 shows the transmitted data is "2"; FIG. 5-3 shows the transmitted data is "1"; FIG. 5-4 shows the transmitted data is "0"; FIG. 5-5 shows the transmission is ended. As a result, when the decoder 133 restores the calculating result to the original data accordingly to afore formulas, one transmission is finished.

Herein, the process of the present invention could be summarized as follows. A data is transmitted into the switching device 11 for turning into the binary numbers. Then, the binary numbers cooperate with the error coefficient and the error beyond value for achieving the calculating result. When the calculating result is received by the medium device 12, the calculating result is further transformed into the correspondent amount of the pulse waves, so that the pulse waves would be sent to the data restoring device 13. Additionally, the counter 132 in the data restoring device 13 is able to count the number of the pulse waves. In the practical application, the data might be interfered by any anonymous noise during the transmission, so that the subsequent amount of the pulse waves is subject to change. For solving this problem, the decoder 133 allows the amount of the pulse waves provided by the counter 132 to divide the error coefficient. Thence, the divided result would be rounded to an integer, and this integer is the binary numbers sent by the calculator 114. Thus, the binary number could be reversed to the original data. Obviously, the present invention allows the error of the amount of the pulse waves to be limited within a certain scope, thereby restraining the noise.

To sum up, the present invention particularly utilizes the medium device to receive the data from the switching device for transmitting the same to the data restoring device. Therefore, the transmitting rate is ensured to be consistent, so user avoids setting the Baud Rate. Accordingly, the application of the interface in the communication would not be difficult, the structure of the interface is simplified, and the present invention is widely applicable. The calculation of the error coefficient and the error beyond value restrains the noise in time of transmission. Therefore, the desired data could be transmitted correctly and reliably.

While we have shown and described the embodiment in accordance with the present invention, it should be clear to those skilled in the art that further embodiments may be made without departing from the scope of the present invention.

I claim:

1. An interface with universal serial communication comprising:

a switching device including an encoder, an error coefficient generator, an error beyond value generator, and a calculator connected to said encoder, said error coefficient generator, and said error beyond value generator; said encoder receiving data and transforming said data into a binary number; said error coefficient generator generating an error coefficient according to said binary number, and said error beyond value generator generating an error beyond value; said binary number, said error coefficient, and said error beyond value being input into said calculator for being further integrated into a calculating result and hence output;

a medium device receiving said calculating result from said calculator and transforming said calculating result into a correspondent pulse wave for outputting; an amount of said pulse wave equaling said calculating result integrated and output by said calculator; and a data restoring device including a frequency divider for receiving said pulse wave from said medium device, a counter connected to said frequency divider, and a decoder connected to said counter; said frequency divider isolating a low frequency pulse wave from a high frequency pulse, so that said low frequency pulse wave is served as a synchronic signal, and said high frequency pulse wave is analyzed by said counter for counting said amount of said pulse wave; while said binary number is achieved in said counter via said amount of said pulse wave dividing said error coefficient, said binary number is restored to said original data.

2. The interface as claimed in claim 1, wherein, said correspondent amount of said pulse wave is reckoned by said binary number times said error coefficient plus said error beyond value.

3. The interface as claimed in claim 2, wherein, an outputting number is reckoned by said binary number times said error coefficient plus said error beyond value; said binary number is Numb, and said outputting value is N, thereby resulting in a formula as N=Numb×said error coefficient+ said error beyond value; while a bandwidth is $\xi$, $f_s$ then represents a speed that a transmitter transmits said encoded data to a receiver; calculated as $\xi=f_s/N$ (Bps).

* * * * *